Dec. 12, 1967  A. MARTIN  3,357,780
FILM DRIVING DEVICE FOR A MOTION PICTURE APPARATUS
Filed March 9, 1964  9 Sheets-Sheet 1

INVENTOR
ALPHONSE MARTIN
BY
Bailey, Stephens & Huettig
ATTORNEY

Dec. 12, 1967  A. MARTIN  3,357,780
FILM DRIVING DEVICE FOR A MOTION PICTURE APPARATUS
Filed March 9, 1964                    9 Sheets-Sheet 2

INVENTOR
ALPHONSE MARTIN
BY Bailey, Stephens &
Huettig
ATTORNEY

Dec. 12, 1967  A. MARTIN  3,357,780
FILM DRIVING DEVICE FOR A MOTION PICTURE APPARATUS
Filed March 9, 1964  9 Sheets-Sheet 3

INVENTOR
ALPHONSE MARTIN
BY Bailey, Stephens &
Huettig
ATTORNEY

Dec. 12, 1967      A. MARTIN      3,357,780
FILM DRIVING DEVICE FOR A MOTION PICTURE APPARATUS
Filed March 9, 1964      9 Sheets-Sheet 6

INVENTOR
ALPHONSE MARTIN
BY Bailey, Stephens &
Huettig
ATTORNEY

Dec. 12, 1967   A. MARTIN   3,357,780
FILM DRIVING DEVICE FOR A MOTION PICTURE APPARATUS
Filed March 9, 1964   9 Sheets-Sheet 7

INVENTOR
ALPHONSE MARTIN
BY Bailey, Stephens & Huettig
ATTORNEY

Dec. 12, 1967 A. MARTIN 3,357,780
FILM DRIVING DEVICE FOR A MOTION PICTURE APPARATUS
Filed March 9, 1964 9 Sheets-Sheet 9

INVENTOR
ALPHONSE MARTIN
BY Bailey, Stephens &
Huetig
ATTORNEY

United States Patent Office 3,357,780
Patented Dec. 12, 1967

3,357,780
FILM DRIVING DEVICE FOR A MOTION
PICTURE APPARATUS
Alphonse Martin, 4 Place de la Republique, Saint-Ouen,
Hauts-de-Seine, France
Filed Mar. 9, 1964, Ser. No. 350,422
Claims priority, application France, Mar. 12, 1963,
927,673; Apr. 11, 1963, 931,233; Sept. 6, 1963, 946,743;
Oct. 30, 1963, 952,226
2 Claims. (Cl. 352—166)

ABSTRACT OF THE DISCLOSURE

A motion picture apparatus which comprises a cylindrical part journalled about its geometrical axis, resiliently urged toward a first predetermined angular position about said geometrical axis with abutment means for stopping said cylindrical part in a second angular position different from the first one, electro-magnetic means being provided for moving said cylindrical part from said first to said second angular position, and a motion picture apparatus movable element operatively connected with said cylindrical part, whereby a succession of electro-magnetic pulses fed to said electro-magnetic means causes successive reciprocating angular displacements thereof about its axis and corresponding displacements of said motion picture apparatus element.

---

The present invention relates to motion picture cameras synchronized with magnetic tape sound recorders.

The chief object of the present invention is to ensure a substantially perfect correspondence between the motion picture position and the magnetic tape position.

Preferred embodiments of the present invention will be hereinafter described with reference to the appended drawings, given merely by way of example, and in which.

Figure 1:
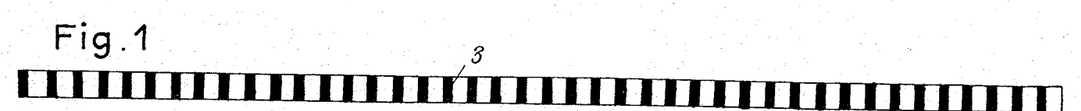
FIG. 1 diagrammatically shows a magnetic tape provided with signs, according to the present invention.

As illustrated by FIGS 1–7 and 10–15, the magnetic tape illustrated by FIG. 1 bears, formed thereon when it is manufactured, a succession of dark transverse lines 3 spaced at regular intervals (FIG. 1). Each of said lines is to correspond to one picture of the moving picture film. If this film is supposed to move at the rate of sixteen pictures per second, and if the magnetic tape moves at the rate of 9.5 cms. per second, there are sixteen lines 3 for every length of the magnetic tape equal to 9.5 cms.

Figures 2, 3:
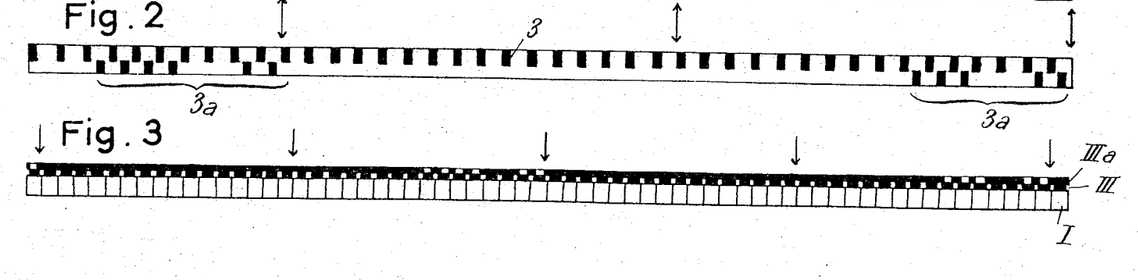
FIG. 2 is a similar view of another kind of magnetic tape to be used according to the present invention.
FIG. 3 shows a motion picture film provided with photographic signs obtained according to the present invention.

Preferably, as shown by FIG. 2, the magnetic tape bears, in addition to said lines 3 extending on one half of the width of said tape, sets of lines 3a extending on the other half of said tape width. The left hand end of each set 3a is at a distance from the left hand end of the next set 3a equal to 19 cms., i.e. a distance corresponding to a time of travel of the tape of two seconds.

FIG. 3 shows the motion picture film. This film includes, adjacent the picture area I, two tracks III and IIIa on which, in response to the movement of the magnetic tape of the sound recorder, the signals of the tracks 3 and 3a of said magnetic tape are to be reproduced, respectively.

Figure 4:
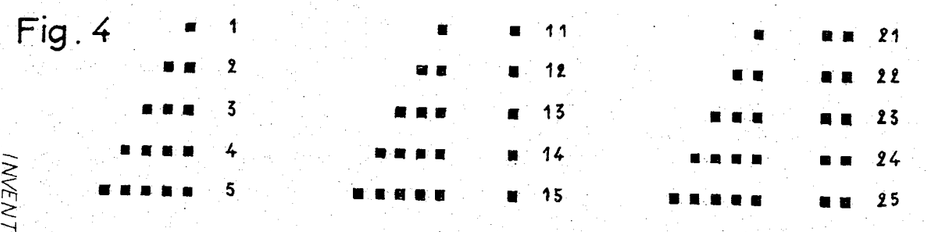
FIG. 4 is a diagrammatical view illustrating a simplified sign code.

A simplified code consisting merely of dots is shown by FIG. 4 and forms numbers in the following order 1–2–3–4–5—11–12–13–14–15—21–22–23–24–25— etc. This code is given merely by way of example.

Figure 5:
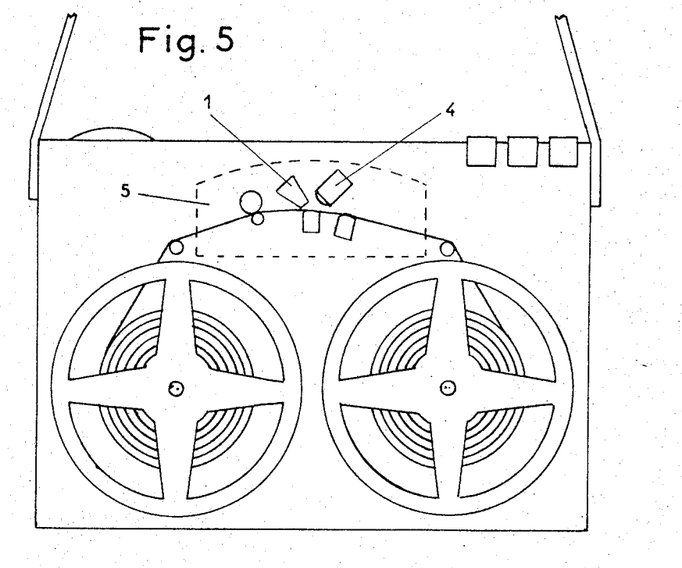
FIG. 5 shows a portable magnetic tape recorder to be used according to the present invention.
Figures 6, 7:
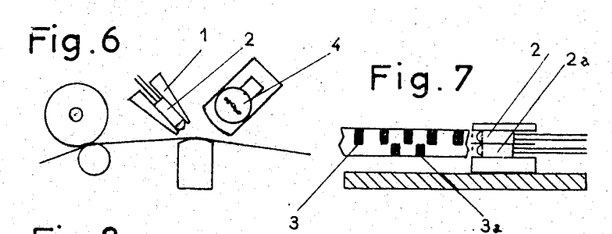
FIG. 6 shows a head including two optical reading elements belonging to said recorder.
FIG. 7 is a sectional view of the reading head of said recorder.

In the example illustrated by the drawings, use is made of a portable magnetic tape sound recorder as shown by FIG. 5, this recorder being provided with a reading head 1 as shown by FIGS. 6 and 7. This head comprises two photodiodes 2 and 2a, for instance germanium photodiodes, each located opposite a track 3 and 3a, for optical reading. A lamp 4 illuminates the portion of the strip located opposite the reading head. A movable cover 5 prevents the illumination of the surrounding atmosphere from reaching the reading device.

During operation, every dark line of track 3 corresponding to a picture produces, through photodiode 2, an electric pulse which after amplification (through a device not shown) is transmitted to an electro-magnet 6 belonging to the camera (FIGS. 10 to 16 inclusive).

Electro-magnet 6, when energized, operates pull down claw 7 which, every time it is actuated, pulls down the film a distance equal to the height of a picture. During this downward movement, shutter 8 is in closed position (FIGS. 10 and 11) but when lever 9, operated by electromagnet 6, comes into its lowest position (FIG. 11), the end of lever 9 comes into engagement, through its lug 10, with the lower end of shutter 8. At the end of the electric pulse, lever 9, urged by spring 11, moves back upwardly (FIGS. 12 and 13) and returns claw 7 into its initial position. This upward movement of lever 9 causes shutter 8 to move upwardly and to open window 14 for exposure of a picture. At the end of the upward movement of lever 9, catch 12 causes the shutter to escape from lug 10 and lever 9, urged by spring 13, moves back down into its initial position, thus closing the shutter in front of window 14.

The film is rewound upon receiver spool 15 owing to the reciprocating movement of hook 16 which operates ratchet wheel 17 to produce the rotation of the spool, with the interposition of a brake (not shown).

The operation of the system is started by depressing electric contact 18 (FIG. 14) which, through cable 19, starts the magnetic tape recorder and indirectly causes the camera to be started by the current transmitted through cable 20 to electro-magnet 6.

In order to be able to ensure the correspondence between the film and the sound recording tape I make use of the signals IIIa formed on the film by the passage of the signals of track 3a in front of photodiode 2a. These signals produce coded series of electrical pulses which are transmitted through a connecting cable to a small lamp 21 the rays of which are reflected at 45° by prism 22 which sends them onto the film track IIIa through aperture 23, thus photographically marking on said film track IIIa every combination of signs. This arrangement permits of making corresponding modifications in the magnetic tape and in the film, respectively, while preserving synchronism.

Figure 8:
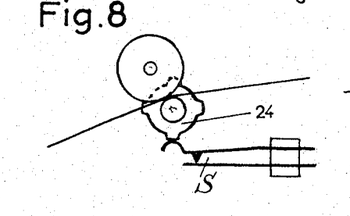
FIG. 8 shows a switch to be used in connection with the magnetic tape according to a modification.
Figure 9:
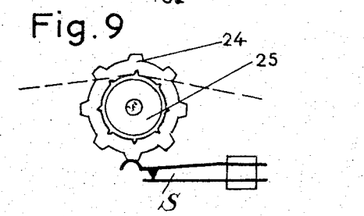
FIG. 9 shows a modification of FIG. 8.
Figure 10:
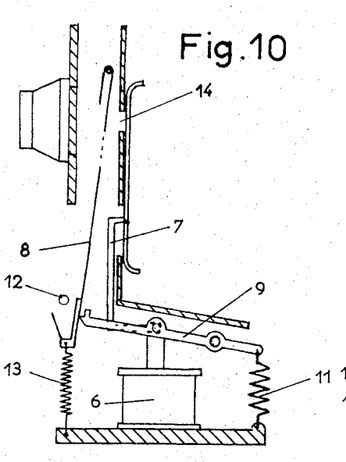
FIGS. 10, 11, 12 and 13 show a camera driving mechanism in four different positions respectively.
Figure 11:
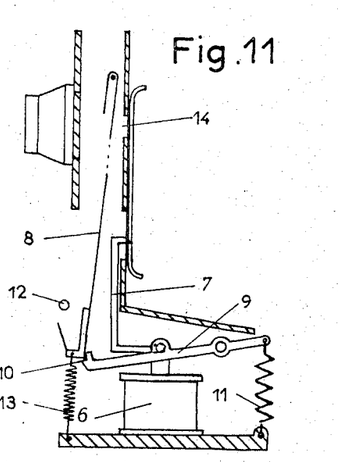
Figure 12:
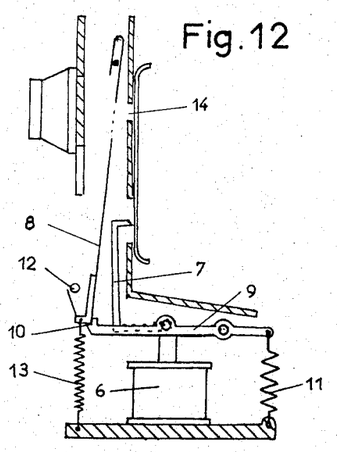
Figure 13:
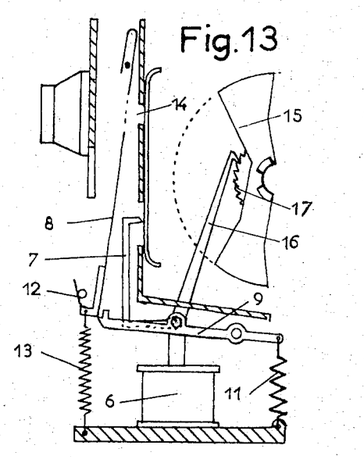
Figure 14:
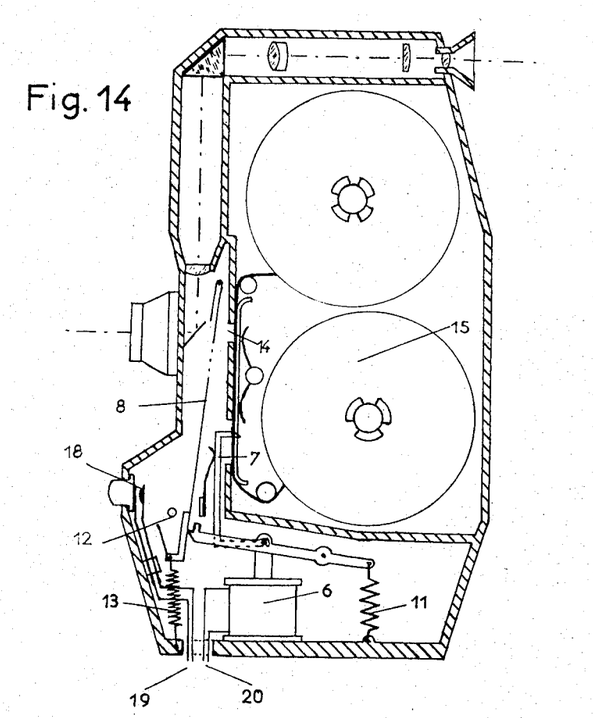
FIG. 14 is a vertical section view of the camera.
Figure 15:
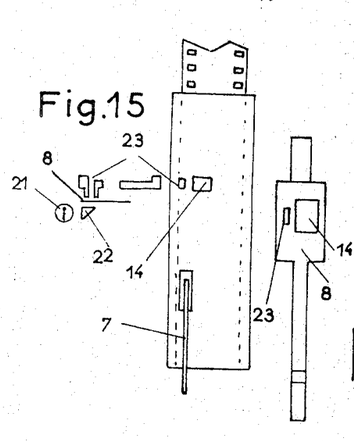
FIG. 15 is a diagrammatical view illustrating the operation of the camera.
Figure 16:
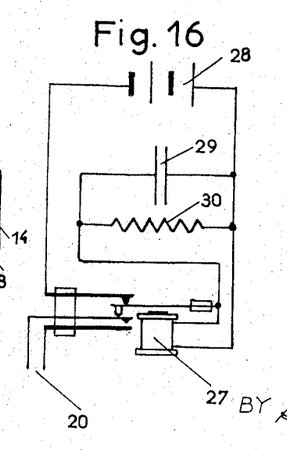
FIG. 16 diagrammatically shows a device for producing electric pulses at regular time intervals.

Such a system may also be used with a magnetic tape bearing no markings. For this purpose, as shown by FIG. 8, instead of reading head 2, the magnetic tape recorder is provided with a switch S mounted in the electric line for transmitting pulses to the camera electro-motor 6, said switch being operated by a cam wheel 24 driven by the motor of the magnetic tape recorder so as to open and close switch S sixteen pulses per second. Such a device replaces the system constituted by the lines 3 of the magnetic tape and the reading head 2. If the magnetic tape is provided with perforations, I may also, as shown by FIG. 9, drive a switch S such as above referred to by means of a cam wheel 24 rigid with a small wheel 25 provided with projections engaging in the perforations of the magnetic tape.

It may happen that it is desired to record pictures upon the film without recording sound on a magnetic tape. In this case use is made of a pulse generator diagrammatically illustrated by FIG. 16. This generator comprises electro-magnet 27 fed with electric current from battery 28. The electric winding of electro-magnet 27 is mounted in parallel with capacitor 29 and resistance 30. This system constitutes a time relay which, upon every beat, causes the feed circuit of the electro-magnet to be opened and closed at a given frequency which corresponds to the operation of the camera. If the camera were made merely for taking pictures without sound recording electro-magnet 6 would be used to constitute the electro-magnet 27 in order to produce beats.

The pulse generator above described is given merely by way of example but it might be replaced by a transistor oscillator or a gas tube discharge oscillator.

The sound motion picture films recorded according to the present invention may be used in projectors comprising a synchronizing device either of the common type or of the type disclosed in my addition patent application No. 898,101 of May 19, 1962 to the French patent filed by me on June 21, 1961 Provisional No. 865,614. The films may be used in a double strip single block projector but it is preferable to provide the projector with a driving mechanism analogous to that of the camera according to the present invention. In other words, in such a projector, the magnetic tape produces pulses which control the feed of the motion picture film. I thus obtain a perfectly synchronized device and it is advisable to provide a shutter producing for instance three openings for every picture.

I might utilize a counter-claw actuated by lever 4, said lever in its upper position retracting said counter-claw and engaging it back into position at the end of the downward movement.

Electro-magnet 6, of the plunger type, has been shown merely by way of example but it might be replaced by any other means for transforming the electric pulses into an oscillatory movement. The pulses might be used to regulate a camera having an electrical motor, every picture pulse being used to permit the passage of only one picture.

Preferably, use is made of magnetic tape marked with a coloring material but these visible signs might be replaced by signs which are magnetically recorded on the margin of the tape and which produce image frequencies by means of magnetic reading heads. If the magnetic tapes are perforated, their perforations may be used as signal producing means.

Figure 17:
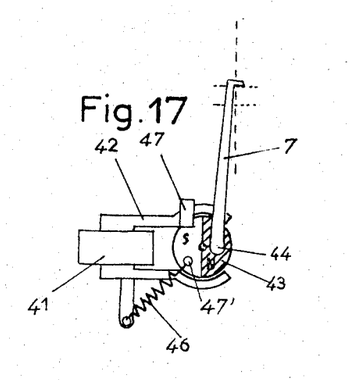
FIG. 17 diagrammatically shows a modification of the electric motor to be used in apparatus according to the present invention.
Figure 18:
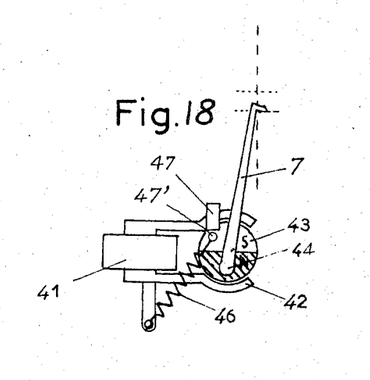
FIG. 18 is a view similar to FIG. 17 but corresponding to another position of the parts.
Figure 19:
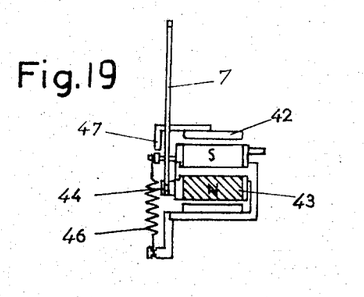
FIG. 19 is an elevational view of the electro-motor of FIGS. 17 and 18.

FIGS. 17 to 19 inclusive show another electro-motor for producing the discontinuous movement of the film. Such an electro-motor comprises a fixed coil or winding 41 cooperating with a soft iron core having extensions 42. These extensions have cylindrical ends coaxially surrounding a cylindrical permanent magnet 43 journalled about its axis. Claw 7 is pivotally mounted on a crank pin 44 carried by said magnet 43. A spring 46 is adapted to return permanent magnet 43 into a given position of rest shown by FIG. 17. Permanent magnet 43 may be made of a magnetic metal but advantageously it will be made of a ferrite, which is much lighter.

The operation of such a motor is as follows:

Every time a sign 3 of a magnetic tape passes the head of the magnetic recorder, an electric pulse is sent to coil 41, thus magnetizing the core extensions 42. Thus permanent magnet 43 rotates about its axis through 90° and comes from the position of FIG. 17 into that of FIG. 18. Crank pin 44 imparts a downward movement to claw 7, thus causing the film to move down a distance corresponding to the height of a picture on every pulse that is received.

This mechanism is advantageously arranged so that the parts, in the state of rest, are kept in the position corresponding to the engagement of claw 7 into a hole of the film (not shown) and that the end of the displacement of the motor corresponds to crank pin 44 being in the position of FIG. 18. Thus the mechanism does not produce any shock when it stops, even if the cylindrical permanent magnet 43 moves beyond the position of FIG. 18. The pulling action exerted on the film stops when said film has reached a given level. In order to prevent the stopping of the magnet from giving rise to an oscillation of claw 7 there is provided a resilient abutment 47 to cooperate with permanent magnet 43.

Immediately after the electric pulse is received in coil 41, spring 46 returns the parts into the position of FIG. 17.

The chief advantage of this device is to have a practically noiseless operation.

Furthermore, the interval between extensions 42 and permanent magnet 43 may be very small, so that the electric consumption of the whole is reduced.

Figure 20:
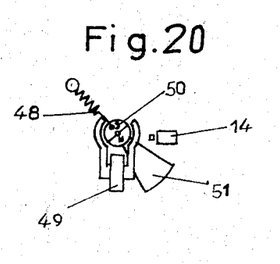
FIGS. 20 and 21 are diagrammatical views illustrating the control of the camera shutter by means of a motor of the kind illustrated by FIGS. 17, 18 and 19, said FIGS. 20 and 21 corresponding to two different positions of the shutter respectively.
Figure 21:
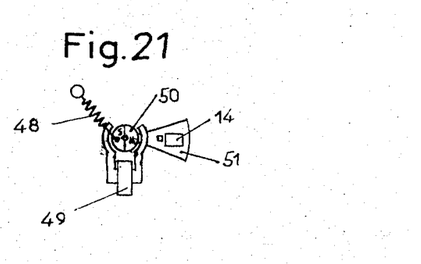

A similar system may be used for controlling the opening and closing movements of the camera shutter, as illustrated by FIGS. 20 and 21.

This shutter is shown at 51 and it is fixed to a permanent magnet 50 rotatable about its axis between the extensions of the core of a winding 49. A spring 48 urges the whole toward a position of rest illustrated by FIG. 20 where shutter blade 51 is not located in front of a window 14.

If an electric pulse is sent to coil 49, permanent magnet 50 will rotate so as to bring shutter blade 51 in front of window 14, this operation taking place without shock and therefore in a silent manner. Means may be provided for slowing down the movement of shutter blade 51 so as to obtain a predetermined variation of the time of exposure.

The operation of a camera provided with the device illustrated by FIGS. 17 to 21 is as follows:

The coil 41 of the electro-magnet for controlling claw 7 and the coil 49 of the electro-magnet for controlling shutter 51 are connected in shunt to the circuit through which current pulses are sent by the magnetic tape recorder. On every current pulse, claw 7 moves in the downward direction, shutter 51 being already closed when this movement starts. Between the pulses claw 7 returns into its upper position and shutter blade 51 is retracted so as to clear window 14 and to permit an exposure. This cycle is repeated on every pulse transmitted from the magnetic tape recorder.

It should be well understood that the electro-motor arrangement including an oscillating permanent magnet such as 43 has been given merely by way of example. I might as well use other electro-motor means while limiting the movement of the parts for instance of claw 7 without shock at the end of this movement.

Figures 22, 23:
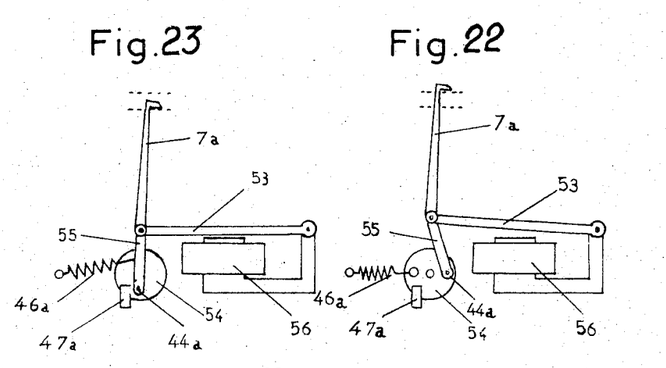
FIGS. 22 and 23 are views similar to FIGS. 17 and 18, respectively, but relating to a modification.

An example of such a device is illustrated by FIGS. 22 and 23. In this case, the movable member 53 of a conventional electro-magnet is connected to the crank pin 44a of disc 54 through a rod 55. Spring 46a urges the whole into the position illustrated by FIG. 22. If a current pulse is sent to coil 56, member 53 is attracted by the magnetic field and moves claw 7a which causes the film to move down a distance corresponding to the height of a picture. The end of this downward movement takes place when crank pin 44a comes into its lowest position, this stopping taking place without shock. A resilient abutment 47a limits this movement.

Figures 24, 24A:
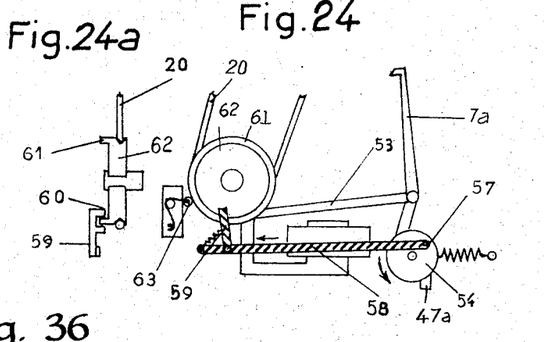
FIG. 24 diagrammatically illustrates a device for the rewinding of the film.
FIG. 24a is a side view corresponding to FIG. 24.

FIG. 24 shows a film driving mechanism actuated by the electro-motor of FIGS. 22 and 23.

Crank pin 57, carried by disc 54, serves to actuate with a reciprocating motion a rod 58 carrying an arm 59 provided with a jaw 60. This jaw 60 is adapted to cooperate in wedging fashion with the rim 61 of spool 62 on every leftward movement of rod 58 corresponding to an anti-clockwise rotation of disc 54, so as to impart a rotating movement to said spool 62 in the clockwise direction. When disc 54 rotates in the clockwise direction, rod 58 is given a sliding movement toward the right, but it does not cause spool 62 to rotate in the anti-clockwise direction, because, in this case, there is no wedging of jaw 60 with rim 61, which is prevented from rotating in the anti-clockwise direction by roller 63.

According to a modification of my invention, the camera, instead of having its electro-motor operated from pulses transmitted from the magnetic tape, is directly operated by current pulses transmitted from a device which will now be described.

Battery 69 has one terminal thereof connected with one terminal of an electro-motor winding 64. The other terminal of said electro-motor winding 64 is connected with a contact 68. A capacitor 71 is mounted in shunt across said terminal of battery 69 and contact 68. The other terminal of battery 69 is connected with one of the terminals 74 of the feed circuit of the electro-motor for driving the film, not shown on FIG. 25. Rotatable magnet 65, placed between the poles of the core extensions 66 of the electro-motor the winding of which is shown at 64, carries a cam 70 adapted to cooperate with a flexible strip 67 resiliently applied against contact 68.

Figure 25:
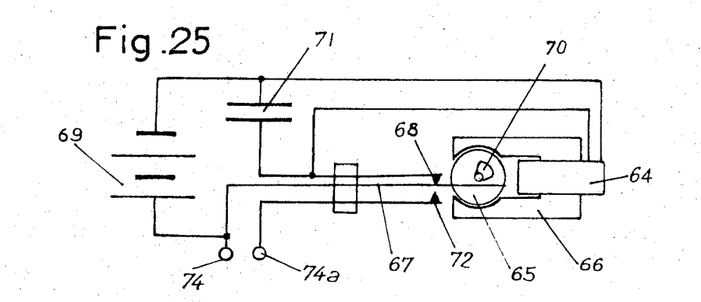
FIGS. 25 and 26 show a generator of pulses occurring at a given frequency.

As long as cam 70 is rotating without acting on flexible strip 67, contact 68 is connected through said strip with the other terminal of battery 69 and closes the circuit. But when cam 70 comes to cooperate with strip 67 it moves said strip 67 away from contact 68 whereas it brings said strip onto contact 72 connected with the terminal 74a of the feed circuit of the electromotor for driving the film (not shown). This feed circuit is therefore closed and the film driving electro-motor brought into operation.

When capacitor 71 is sufficiently discharged, spiral spring 73 stops the rotation of magnet 65 and starts it back in the opposed direction.

Terminals 74 and 74a are again cut off from each other whereas the circuit of battery 69 is again closed and the above described operation is repeated.

The frequency that is obtained depends upon the capacity of capacitor 71 and this adjustment may be completed by a suitable determination of the strength of spring 73 in accordance with the inertia of the magnet.

In the preceding embodiments, the movable elements of the electro-magnets, or electro-motors, for pulling the film were illustrated, by way of example, with a spring serving to exert a return force thereon. This return spring may be dispensed with by providing means for reversing the feed current of the electro-magnet serving to control the unwinding of the film. In other words, for a given direction of the feed current said electro-magnet causes the claw 7 to pull down the film whereas, for the opposed direction of said current, the electro-magnet causes said claw to move upwardly.

In the case where use is made of a camera controlled directly by a frequency generator as above described with reference to FIG. 25 it is necessary, if a return spring is not provided to move back the claw into its initial position to cause, upon every reciprocation, the current to flow first in one direction to move the film down and then in the opposed direction to return the claw to its initial position.

Figures 26, 27:
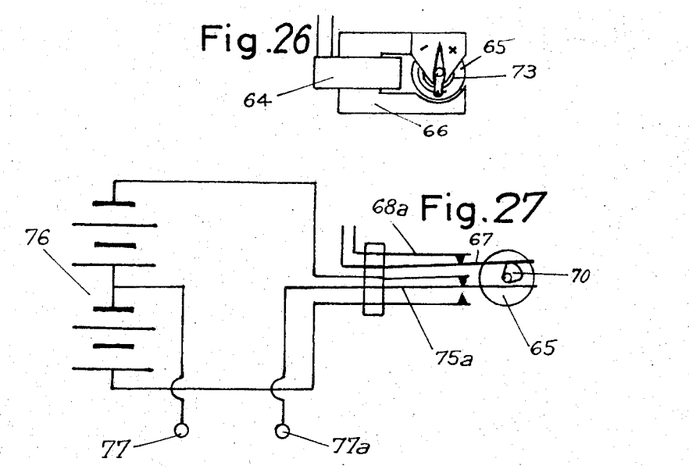
FIG. 27 shows a single direction reversing switch.

Such a device is illustrated by FIG. 27 which comprises in addition to the means illustrated by FIG. 25 a supplementary flexible strip 75a which alternately reverses the current supplied by battery 76 to terminals 77 and 77a from which said current is transmitted to the electro-motor serving to pull down the film. Such a system is suitable for devices comprising a single winding for the electro-motor 6 serving to drive the film pulling claw 7.

Figure 28:
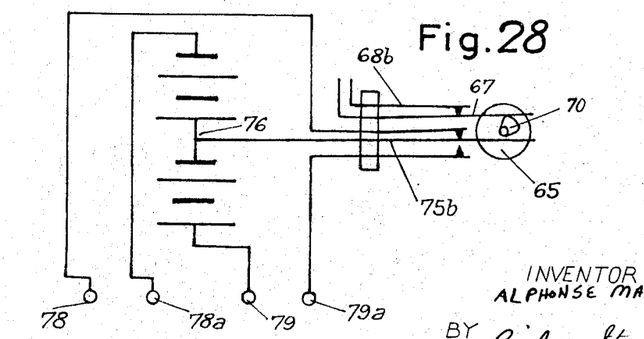
FIG. 28 shows a two direction reversing switch.

In another embodiment of my invention, illustrated by FIG. 28, strip 25b produces a current alternately in one direction and in the other direction but the current in one direction is directed to terminals 78 and 78a and the current in the opposed direction is directed to terminals 79 and 79a. This arrangement is therefore suitable in the case where the claw serving to pull down the film is subjected to the action of two windings one of which serves to operate said claw in the direction that pulls down the film whereas the other controls the return movement of said claw.

Figure 29:
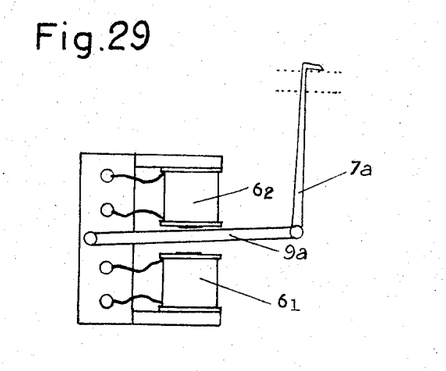
FIG. 29 shows an electro-magnet with two opposed coils.

A film driving device provided with two opposed windings permits of using several speeds of operation. It comprises, as shown by FIG. 29, two windings $6_1$ and $6_2$ mounted opposite each other and between which is disposed the armature 9a which drives claw 7a, such an arrangement being intended, for instance, to be used with the control device illustrated by FIG. 28. The first current pulse causes the lower winding $6_1$ to be energized and claw 7a to move down. The next pulse, of opposed direction, causes the upper winding $6_2$ to be energized and to return claw 7a into its position of rest as a result of its upward displacement.

Figure 30:
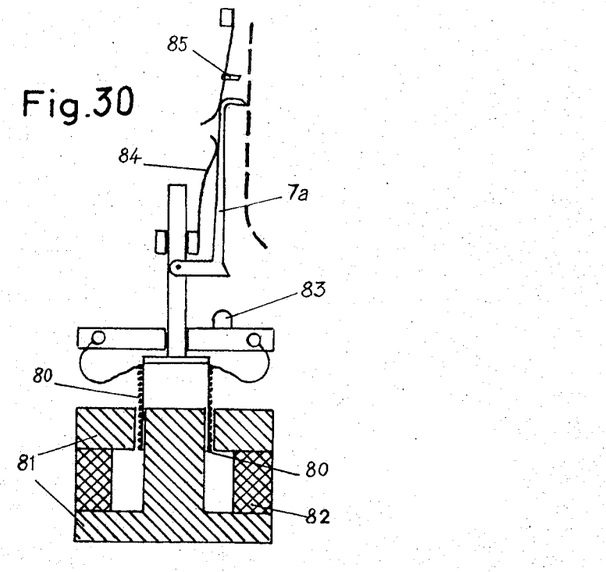
FIG. 30 shows a device for pulling down the film at high speed.

According to another arrangement, illustrated by FIG. 30, use is made of a device including a movable coil 80 placed in the air gap of the core structure 81 of the permanent magnet 82. This movable coil 80 is carried by a rod on which claw 7a is pivotally mounted, such a device being operated by a circuit such as illustrated by FIG. 27.

The operation of such a device is as follows: The current impulse causes coil 80 to move down, thus pulling claw 7a as far as abutment 83. If claw 7a is further displaced, it pivots with respect to the support of coil 80, thus compressing spring 84 and moving out from the perforation of the film where it was engaged. Thus abutment 83 has not stopped the movement of claw 7a but the film has been stopped at a given level. If claw 7a moves beyond the point where it has disengaged from the film its movement is resiliently absorbed by spring 84 but it has no effect upon the level at which the film has been stopped.

This arrangement permits of taking pictures at a very high frequency.

The various films driving devices above described, instead of being controlled by a magnetic tape or by a pilot relay may be controlled by an external signal, for instance through a contactor mounted on the object to be photographed, for instance upon a lathe or any other machine tool so as to permit of observing the operation thereof, upon a vibrating or rotating table carrying objects the vibration of acceleration movements of which are to be observed, and so on.

This film driving device permits also of photographing a television screen, the pulse for controlling the electromagnet being produced by the beginning of every scanning cycle of the television receiver.

In the embodiment illustrated by FIG. 30, counter claw 85 is disengaged from the holes of the film when claw 7a is in the position of rest. During the movement of claw 7a for which it pulls down the film, the counter claw comes to be applied against the film and to engage into a hole thereof. When claw 7a is in its lowest position, the counter claw keeps the film in position so that it does not move after claw 7a has been disengaged therefrom.

Figure 31:
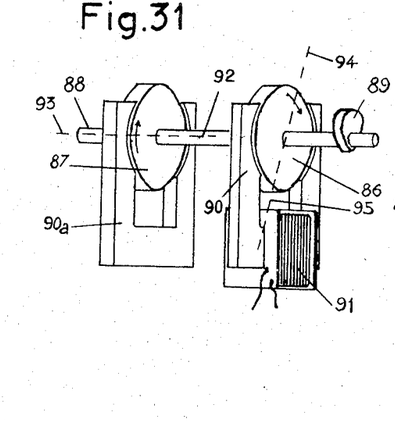
FIG. 31 shows a magnetic device for producing rotation of a cam.
Figure 32:
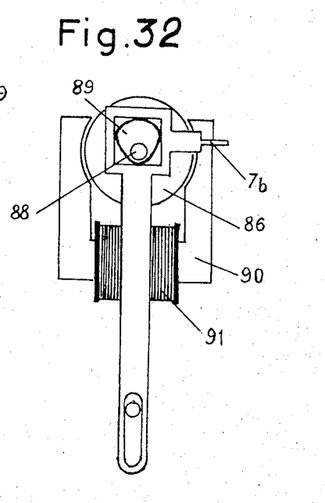
FIG. 32 shows a cam driving system.

In the embodiment of FIGS. 31 and 32 the electromotor for driving the film comprises two circular magnets 86 and 87 mounted on a common shaft 88 carrying, fixed thereon, cam 89 through which claw 7b is actuated. Magnet 86 is located between core extensions 90 through which passes the magnetic field of the induction winding 91, when said winding is energized. Magnet 87 is located in core extension 90a which is not provided with a winding. Cam 89 causes claw 7b to be engaged into a perforation of the film, to pull it down, to disengage the claw from the film perforation and finally to return the claw into its initial position.

In such a system the magnetic tape controlled device or the frequency generator must produce, for every picture, first a current pulse producing a rotation of 180° of magnet 86 corresponding to the downward movement of the film and then a second current pulse of opposed direction producing another rotation through 180° of magnet 86 corresponding to the upward return movement of the claw. But between these two current pulses of opposed signs, magnet 86 is in an unstable position. In other words, after the first pulse, which causes the claw to move down, magnet 86 is in a dead center position and the second current pulse, of opposed sign, which produces the second half revolution of the magnet to move back the claw upwardly might take place either in one direction or in the other. In order to obviate this, magnet 87 has not its terminals exactly perpendicular to those of magnet 86. Magnet 87 has its terminals located on a horizontal line 92, 93 whereas magnet 86 has its terminals upon line 94, 95.

In the position of rest, core extension 90a, through which passes the field of magnet 87 will therefore urge the poles of said magnet to remain approximately upon horizontal line 92, 93, which causes an angular offsetting of magnet 86 with respect to its position of rest. Thus, on every pulse, magnet 86 which has an angular position slightly offset in the preferred direction will turn in this direction, so that, in response to the two successive pulses, respectively of opposed signs, the magnets will make a complete revolution.

This device drives cam 89 which operates claw 7b and causes it to move along a rectangular path on every revolution.

Figures 33, 34:
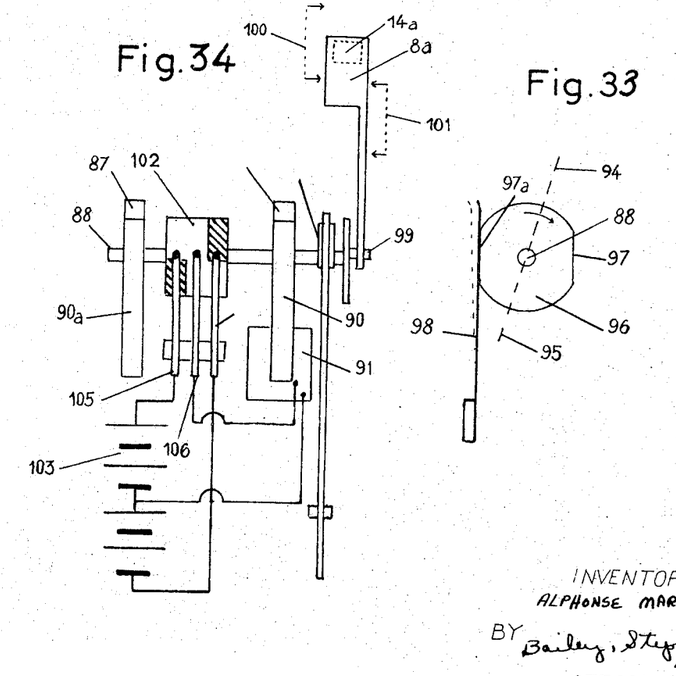
FIG. 33 shows a mechanical device for producing rotation of a cam.
FIG. 34 shows a mechanism for driving the film and operating the shutter.

This magnetic offsetting system result may be replaced, as shown by FIG. 33, by the use of a cam 96 having two flat portions 97, 97a. After every half revolution spring 98 keeps magnet 86 in an angular position slightly offset with respect to its position of rest, which ensures a preferential direction of rotation.

In the embodiment of FIG. 34, shaft 88 links the movement of rotation of cam 89 with that of crank pin 99, which controls the movement of shutter 8a. During the downward movement of the film said shutter 8a will be located in front of the window 14a through which the film is exposed and will move along path 100. During the upward movement of claw 7a, the shutter will move along path 101, permitting exposure of the picture. The shutter opening movement may be slowed down by placing a winding on the core 90a of magnet 87. The circuit of this winding being connected to an adjustable resistor, will permit an adjustment of the induced current produced by the rotation of the magnet, this arrangement serving to adjust the time of exposure.

In the mechanism above described the pulses alternately of opposed signs are sent either from a reversing pilot relay or from a tape with a double track, the signals from one track producing a current in one direction, the signals from the other track producing a current in the opposed direction.

If the camera electro-motor winding is not fed with current pulses from the outside, I may use an arrangement such as shown by FIG. 34.

A switch drum 102 is mounted on shaft 88 and it cooperates with three brushes, respectively 104, 105 and 106. Brush 104 is connected with the negative terminal of battery 103. Brush 105 is connected to the positive terminal of said battery. Brush 106 is connected to winding 91. The middle point of battery 103 is connected to winding 91. The operation is as follows: On every half revolution, the direction of current is reversed, causing magnet 86 to rotate.

Switch drum 102 may be used in such manner that only the contact producing upward movement of the camera claw is used, the downward movement of said claw being ensured by pulses from an external source.

Figure 35:
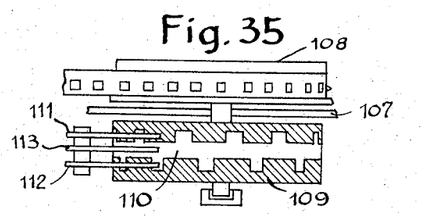
FIG. 35 shows a generator of pulses occurring at a given frequency, this generator being operated by contact.

I may also, as shown by FIG. 35, make use of a frequency generator mounted on the plate 107 of a magnetic tape sound recorder. The perforated sound record magnetic tape is placed on the toothed feeding device 108 rigid with the insulating material cylinder 109. Switch drum 110 is made of an electricity conducting material. It comprises a central continuous annular track and two sets of projections disposed on either side thereof and stepped with respect to each other. Brush 111 is connected with the positive terminal of a battery (not shown). Brush 112 is connected with the negative terminal of said battery. Brush 113 connects the driving mechanism circuit with an intermediate point of the battery. Brushes 111 and 112 bear on the sets of projections of electricity conducting material. Brush 113 bears on the central annular track.

This generator permits of producing pulses in synchronism with the sound magnetic tape, these pulses being alternately of opposed signs.

Figure 36:
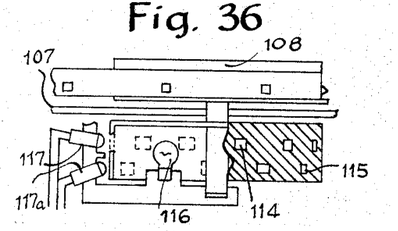
FIG. 36 shows a generator of pulses occurring at a given frequency, this generator being operated through electro-optical means.

In an analogous arrangement, illustrated by FIG. 36, switch drum 110 is replaced by a hollow cylinder provided with two sets of perforations 114 and 115 forming two tracks. Perforations 114 pass between lamp 116 and photodiode 117. Perforations 115 pass between said lamp 116 and photodiode 117a. The perforations 114 and 115 of the two tracks are disposed in stepped fashion with respect to one another so that photodiodes 117 and 117a are alternately energized. Thus I obtain, after amplification, pulses of alternately opposed directions.

Instead of using perforations such as 114 and 115, the cylinder that carries them might be provided with signs of two different colors, illuminated by a lamp, the photodiodes being then energized by the light reflected from said signs.

In a general manner, while I have in the above description disclosed what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a motion picture apparatus, in combination, an electro-magnet including a winding and a core, a member disposed opposite said core movable in response to the magnetizing thereof, a disc rotatable about an axis transverse to the direction of movement of said member, a link connecting a point of said disc to said member, means for resiliently opposing the displacements of said disc produced by the movement of said member resulting from the energizing of said electro-magnet, abutment means for limiting the movement of said disc to the dead center position of said disc, a film winding spool and means responsive to the movement of said disc for unidirectionally driving said film winding spool for rotations of said disc in one direction.

2. In a motion picture apparatus for driving a film, in combination,
   a fixed structure,
   a member pivoted to said fixed structure about a first axis,
   an electro-magnet including a core and a winding carried by said fixed structure and adapted, when energized, to pivot said member about said first axis toward said core,
   a disc reciprocally rotatable about a second axis parallel to said first axis,
   a link pivotally connected to said member and to said disc about axes parallel to said first and second axes, the dimensions of said link, of said member and of said disc and the respective positions of said first and second axes being such that the plane defined by said link and the axes about which the ends thereof pivot passes through said disc axis when said electro-magnet has attracted said member, the position of said link being then called dead center position,
   spring means interposed between a point of said disc and a point of said fixed structure for resiliently opposing rotation of said disc produced by the pivoting of said member resulting from the energizing of said electro-magnet,
   resilient abutment means carried by said fixed structure and cooperating with said disc for limiting the rotation of said disc about its axis to the position thereof where said link is in said dead center position,
   a film driving element, and
   means responsive to the movement of said disc for unidirectionally driving said film driving element in response to rotation of said disc in one direction.

References Cited

UNITED STATES PATENTS 2,909,096  10/1959  Barnett ____________ 352—191

FOREIGN PATENTS 690,369  6/1930  France.
867,051  2/1953  Germany.

JULIA E. COINER, *Primary Examiner.*